No. 681,702. Patented Sept. 3, 1901.
A. I. JACOBS.
VARIABLE SPEED MECHANISM.
(Application filed June 11, 1901.)

(No Model.)

Witnesses
C. F. Kilgore
T. R. Holcomb

Inventor
Arthur I. Jacobs
Harry P. Williams
Attorney

THE NORRIS PETERS CO., PHOTO-LITHO., WASHINGTON, D. C.

UNITED STATES PATENT OFFICE.

ARTHUR I. JACOBS, OF HARTFORD, CONNECTICUT, ASSIGNOR TO THE SMYTH MANUFACTURING COMPANY, OF SAME PLACE.

VARIABLE-SPEED MECHANISM.

SPECIFICATION forming part of Letters Patent No. 681,702, dated September 3, 1901.

Application filed June 11, 1901. Serial No. 64,058. (No model.)

*To all whom it may concern:*

Be it known that I, ARTHUR I. JACOBS, a citizen of the United States, residing at Hartford, in the county of Hartford and State of Connecticut, have invented certain new and useful Improvements in Variable-Speed Mechanism, of which the following is a specification.

This invention relates to a mechanism by means of which driving gear-wheels or pulley-wheels of different diameters may be connected with driving means for the purpose of furnishing power at different speeds.

The object of the invention is to provide a very simple mechanism whereby the gear-wheel or pulley-wheel which it is desired to used may be quickly and firmly secured to the driving part and the other gear-wheels or pulley-wheels loosened from the driving part, so as to run idle.

The embodiment of the invention that is illustrated in the accompanying drawings has a sleeve with one fixed and four loose gear-wheels. In the sleeve beneath each loose gear-wheel is an inclined mortise containing a wedge that is engaged by the end of a screw-spindle, so that when a screw is turned in a wedge is forced outwardly against the wall of the opening through the gear-wheel that is on the sleeve over the wedge.

Figure 1:
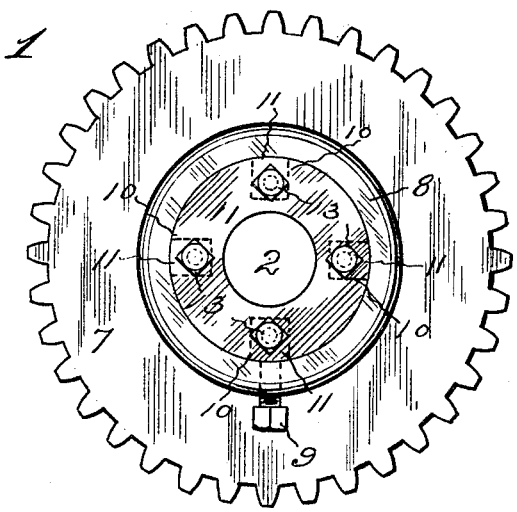
Figure 2:
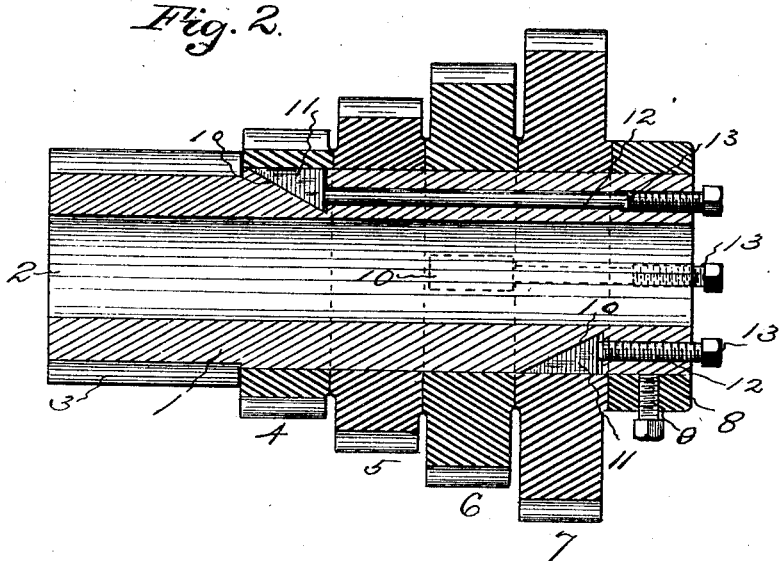
Figure 3:
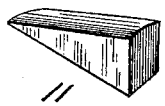

Figure 1 of the drawings is a view looking at one end of the mechanism. Fig. 2 is a diametrical longitudinal section of the mechanism, and Fig. 3 is a view of one of the loose wedges that are carried by the sleeve.

The sleeve 1 has a central perforation 2, adapted to fit a shaft or arbor. Formed upon one end of the sleeve that is shown is a gear-wheel 3. The sleeve may be any desired length, and the gear-wheel, which could of course be a pulley-wheel instead of a gear-wheel, may be of any desired diameter and may be formed integral with the sleeve or independent of the sleeve and fastened thereto by any common means. The gear-wheels 4, 5, 6, and 7 are loosely mounted upon the sleeve. These gear-wheels are held in place by a collar 8, which is fastened to the sleeve by a set-screw 9. These gear-wheels could of course be pulley-wheels. In the sleeve, inside of each gear-wheel, is a mortise 10 with an inclined bottom wall. These mortises are preferably made in different sides of the sleeve. In each mortise is a loose wedge 11. Openings 12 are drilled from one end of the sleeve into the several wedge-mortises. Portions of these openings are threaded and in them are placed screw-spindles 13. The inner end of each spindle or screw thrusts against the wider end of a wedge. The sleeve is driven by the gear-wheel 3, and the power is transmitted from the sleeve to the machine to which the mechanism is applied by the gear-wheel that has the necessary diameter to give the desired speed. If it is desired to run the machine slowly by the gear-wheel 4, then the upper of the spindles 13 is screwed in, so that the upper wedge 11 will clamp the gear-wheel 4 to the sleeve. The other spindles are unscrewed, leaving the gear-wheels 5, 6, and 7 loose upon the sleeve. If it is desired to run the machine rapidly by the gear-wheel 7, the lower of the spindles is turned in, so that the lower wedge will bind the gear-wheel 7 to the sleeve, and then the other spindles are unscrewed, leaving the gear-wheels 4, 5, and 6 loose on the sleeve.

This mechanism is simple to construct, easy to manipulate, and provides a very satisfactory means for permitting a machine to be run at various speeds.

The mechanism is not designed for machines in which instantaneous changes of speed are required, but is more particularly intended for machines in which it is desired to operate a feed mechanism for a time at one speed and then for a time at a different speed.

I claim as my invention—

1. A variable-speed mechanism having a sleeve, a wheel secured to the sleeve, wheels loose on the sleeve, said sleeve having a mortise inside of each loose wheel, a wedge in each mortise, and a screw for moving each wedge outwardly, substantially as specified.

2. A variable-speed mechanism consisting of a sleeve, a wheel secured to the sleeve, wheels loose on the sleeve, said sleeve having a longitudinal mortise inside of each loose wheel, a longitudinally-movable wedge located in each mortise, said sleeve having an opening from an end of the sleeve to each wedge-mortise, and a longitudinally-movable screw located in each opening and arranged to thrust against the wider end of a wedge, substantially as specified.

3. A variable-speed mechanism consisting of a sleeve, a wheel secured to the sleeve, wheels loose on the sleeve, a collar fastened to the sleeve for retaining the loose wheels in place, said sleeve having a mortise inside of each loose wheel, a wedge located in each mortise, and a screw extending from an end of the sleeve and thrusting against the wider end of each wedge, substantially as specified.

ARTHUR I. JACOBS.

Witnesses:
V. R. HOLCOMB,
H. R. WILLIAMS.